US009323673B2

(12) United States Patent
Habermann et al.

(10) Patent No.: US 9,323,673 B2
(45) Date of Patent: *Apr. 26, 2016

(54) HIERARCHICAL CACHE STRUCTURE AND HANDLING THEREOF

(71) Applicant: INTERNATIONAL BUSINESS MACHINES CORPORATION, Armonk, NY (US)

(72) Inventors: Christian Habermann, Boeblingen (DE); Christian Jacobi, Poughkeepsie, NY (US); Martin Recktenwald, Schonaich (DE); Hans-Werner Tast, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/070,639

(22) Filed: Nov. 4, 2013

(65) Prior Publication Data

US 2014/0129773 A1 May 8, 2014

(30) Foreign Application Priority Data

Nov. 8, 2012 (GB) .................................. 1220120.8

(51) Int. Cl.
*G06F 3/00* (2006.01)
*G06F 9/46* (2006.01)
*G06F 12/08* (2006.01)

(52) U.S. Cl.
CPC ........ *G06F 12/0811* (2013.01); *G06F 12/0848* (2013.01); *G06F 12/0897* (2013.01)

(58) Field of Classification Search
CPC ............ G06F 12/0848; G06F 12/0853; G06F 12/0877
See application file for complete search history.

(56) References Cited

U.S. PATENT DOCUMENTS

| | | | |
|---|---|---|---|
| 5,680,571 A | 10/1997 | Bauman | |
| 7,251,710 B1 * | 7/2007 | Isaac et al. | ................... 711/118 |
| 7,290,116 B1 | 10/2007 | Grohoski et al. | |
| 7,680,985 B2 | 3/2010 | Luick | |
| 7,769,955 B2 | 8/2010 | Özer et al. | |
| 7,890,699 B2 | 2/2011 | Comparan et al. | |
| 7,934,081 B2 | 4/2011 | Davis et al. | |
| 7,937,530 B2 | 5/2011 | Luick | |
| 8,015,362 B2 | 9/2011 | Alexander et al. | |
| 8,578,103 B2 | 11/2013 | Kobayashi | |
| 2002/0073280 A1 | 6/2002 | Ng | |

(Continued)

OTHER PUBLICATIONS

Office Action for U.S. Appl. No. 14/935,909 dated Jan. 29, 2016, pp. 1-9.

*Primary Examiner* — Hyun Nam
(74) *Attorney, Agent, or Firm* — Margaret McNamara, Esq.; Blanche E. Schiller, Esq.; Heslin Rothenberger Farley & Mesiti P.C.

(57) ABSTRACT

A hierarchical cache structure comprises at least one higher level cache comprising a unified cache array for data and instructions and at least two lower level caches, each split in an instruction cache and a data cache. An instruction cache and a data cache of a split second level cache are connected to a third level cache; and an instruction cache of a split first level cache is connected to the instruction cache of the split second level cache, and a data cache of the split first level cache is connected to the instruction cache and the data cache of the split second level cache.

20 Claims, 5 Drawing Sheets

(56) References Cited

U.S. PATENT DOCUMENTS

| | | |
|---|---|---|
| 2002/0083312 A1 | 6/2002 | Sinharoy |
| 2007/0156969 A1 | 7/2007 | Tian et al. |
| 2008/0270758 A1 | 10/2008 | Ozer et al. |
| 2009/0006753 A1 | 1/2009 | Luick |
| 2009/0006754 A1 | 1/2009 | Luick |
| 2009/0006803 A1 | 1/2009 | Luick |
| 2009/0006812 A1 | 1/2009 | Luick |
| 2009/0216949 A1 | 8/2009 | Krumm et al. |
| 2010/0180084 A1* | 7/2010 | Cypher ............... 711/135 |
| 2013/0047162 A1* | 2/2013 | Stefanov et al. ......... 718/102 |
| 2014/0115258 A1 | 4/2014 | Week et al. |
| 2014/0129774 A1* | 5/2014 | Habermann et al. ....... 711/122 |
| 2015/0154216 A1 | 6/2015 | Maybee et al. |

* cited by examiner

HIERARCHICAL CACHE STRUCTURE AND HANDLING THEREOF

PRIOR FOREIGN APPLICATION

This application claims priority from United Kingdom patent application number 1220120.8, filed Nov. 8, 2012, which is hereby incorporated herein by reference in its entirety.

BACKGROUND

One or more aspects of the present invention relate in general to the field of hierarchical cache structures, and in particular to handling a hierarchical cache structure.

A cache memory, or cache, is a high speed memory positioned between a processor and main storage, to hold recently accessed main storage data. Whenever data in storage is accessed, it is first determined whether or not the data is in the cache and, if so, it is accessed from the cache. If the data is not in the cache, the data is obtained from the main storage and the data is also stored in the cache, usually replacing other data which had been stored in the cache memory. Usually a cache hierarchy is implemented, where multiple levels of cache exist between the processor and main storage. As one gets farther away from the processor, each cache gets larger, slower and cheaper per byte. The cache closest to the processor is called first level cache, the next-closest cache is called second level cache, and the next-closest cache is called third level cache, and so on.

One processor may have multiple first level caches, such as one first level cache for data and/or operands and one first level cache for instructions. That means that the first level cache is split in a first level data cache and in a first level instruction cache. A unified second level cache may be connected to multiple first level caches where the first level caches are either for the same processor or for multiple processors in a multi-processor system. Additionally the second level cache is the superset of the first level cache, i.e. all cache-line data of the first level cache is also in the second level cache.

This first structure has the advantage that the first level instruction cache and the first level data cache take the portion of the second level cache according to the access sequence in case of request misses to the second level cache. But, the first level cache that causes less misses will see less hits in the second level cache. E.g. if the processor works on a long stream of data, it will remove most of the instruction lines from the second level cache causing the first level instruction cache to miss and get misses in the second level cache with it.

Further the second level cache may also be split in a second level data cache and in a second level instruction cache, wherein the first level instruction cache is connected to the second level instruction cache and the first level data cache is connected to the second level data cache. A unified third level cache may be connected to multiple second level caches.

This second structure has the advantage that the first level instruction cache and the first level data cache each have a fixed share and do not run into the problem of the above described first structure. But, cache-lines that contain instructions and data modified by the program play ping-pong between the second level instruction cache and the second level data cache.

In the Patent Application Publication US 2007/0156969 A1, which is hereby incorporated herein by reference in its entirety, a method of synchronizing an instruction cache and a data cache by coupling them and thereby saving unnecessary processor time used to synchronize the instruction cache and the data cache is disclosed. The disclosed method performs a direct memory access (DMA) operation in a virtualized environment to obtain a page from a memory and to store the page in a data cache. Because such DMA operations occur without help of a processor, the system needs to maintain coherency between the instruction cache and the data cache. To do this, signals on a bus, such as so-called snoop cycles, are used to invalidate cacheable pages that a direct memory access modifies. Thus in a virtual machine monitor environment, a guest operating system that issues direct memory access read operations expects to see instruction and data caches to be synchronized when the operation is completed as in a native system operation. However, when performed by emulation, such direct memory access read operations cache data into a data cache but not into an instruction cache.

In the Patent Publication U.S. Pat. No. 8,015,362 B2, which is hereby incorporated herein by reference in its entirety, a method and system for handling cache coherency for self-modifying code is disclosed. The disclosed method for handling cache coherency for self-modifying code comprises allocating a tag in a data cache for a store operation, and sending the tag with an exclusive fetch for the cache-line to coherency logic. An invalidation request is sent within a minimum amount of time to an instruction cache, preferably only if it has fetched the cache-line and has not been invalidated since, which request includes an address to be invalidated, the tag and an indicator specifying the cache-line is for a program store compare operation. The method further includes comparing the request address against stored addresses of pre-fetched instructions, and in response to a match, sending a match indicator and the tag to a load store unit, within a maximum amount of time. The match indicator is timed, relative to exclusive data return, such that the load store unit can discard pre-fetched instructions following execution of the store operation that stores a cache-line subject to an exclusive data return, and for which the match is indicated.

Both documents deal with ways to synchronize data caches and instruction caches and to keep the two first level caches coherent.

BRIEF SUMMARY

In an embodiment of the present invention, a hierarchical cache structure is provided that comprises at least one higher level cache comprising a unified cache array for data and instructions and at least two lower level caches each split in an instruction cache and a data cache; wherein an instruction cache and a data cache of a split second level cache are connected to a third level cache; and wherein an instruction cache of a split first level cache is connected to the instruction cache of the split second level cache and a data cache of the split first level cache is connected to the instruction cache and the data cache of the split second level cache.

BRIEF DESCRIPTION OF THE SEVERAL VIEWS OF THE DRAWINGS

One embodiment of the present invention, as described in detail below, is shown in the drawings, in which.

DETAILED DESCRIPTION

Figure 1:
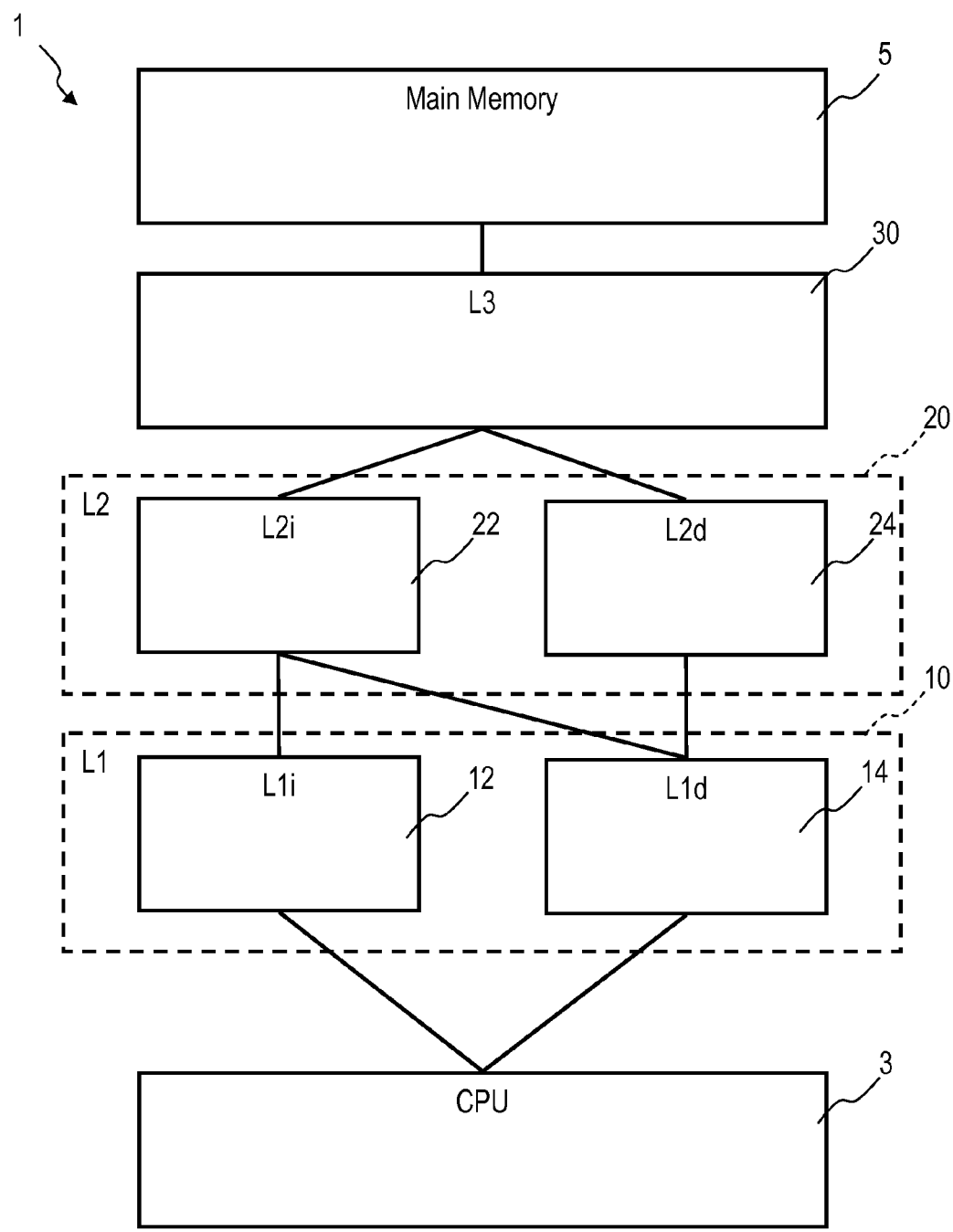
FIG. 1 is a schematic block diagram of a hierarchical cache structure, in accordance with an embodiment of the present invention.

A technical problem underlying an aspect of the present invention is to provide a hierarchical cache structure and a technique for handling a hierarchical cache structure, which are able to improve coherence between instruction cache and data cache in a multi-level cache hierarchy and to solve the shortcomings and pain points of prior art hierarchical cache structures.

According to aspects of the present invention this problem is solved by providing a hierarchical cache structure, a method for handling a hierarchical cache structure, a data processing program for handling a hierarchical cache structure, and a computer program product for handling a hierarchical cache structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
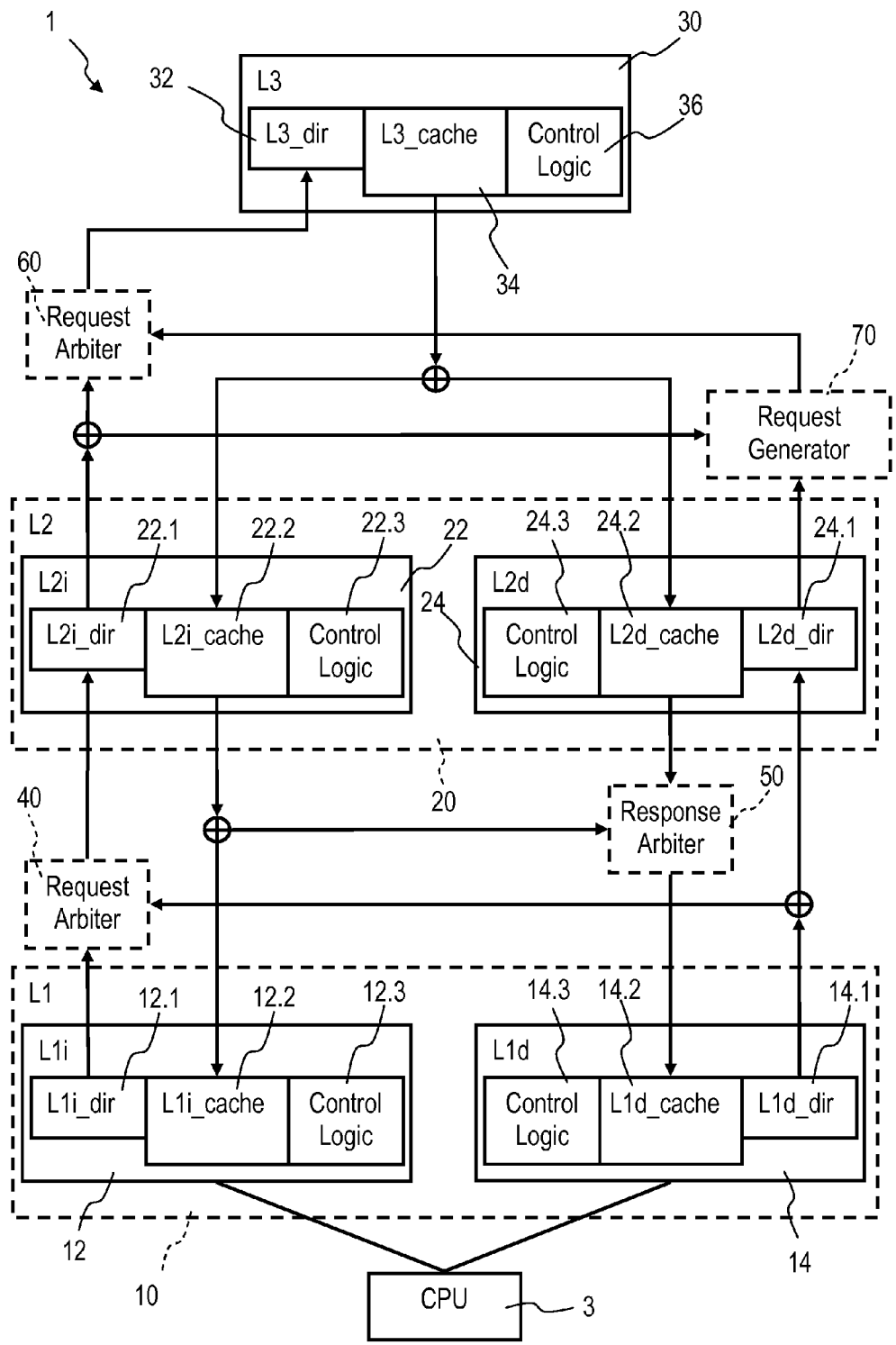
FIG. 2 is a more detailed block diagram of the hierarchical cache structure of FIG. 1, in accordance with an embodiment of the present invention.

FIGS. 1 and 2 show a hierarchical cache structure 1, in accordance with an embodiment of the present invention.

Referring to FIGS. 1 and 2, the shown embodiment of the present invention employs a hierarchical cache structure 1 arranged between a processor 3 and a main memory 5. In the shown embodiment the hierarchical cache structure 1 comprises three levels, wherein a third level cache (L3) 30 comprises a unified cache array (L3_cache) 34 for data and instructions, and two lower level caches (L1) 10, (L2) 20 are each split in an instruction cache (L1i) 12, (L2i) 22 and a data cache (L1d) 14, (L2d) 24. An instruction cache (L2i) 22 and a data cache (L2d) 24 of a split second level cache (L2) 20 are connected to the third level cache (L3) 30. An instruction cache (L1i) 12 of a split first level cache (L1) 10 is connected to the instruction cache (L2i) 22 of the split second level cache (L2) 20 and a data cache (L1d) 14 of the split first level cache (L1) 10 is connected to the instruction cache (L2i) 22 and the data cache (L2d) 24 of the split second level cache (L2) 20.

Referring to FIG. 2, the third level cache (L3) 30 comprises a directory (L3_dir) 32 for the unified cache array (L3_cache) 34 and a control logic 36. Also the instruction caches (L1i) 12, (L2i) 22 of the different cache levels (L1) 10, (L2) 20 each comprise a directory (L1i_dir) 12.1, (L2i_dir) 22.1, a corresponding cache array (L1i_cache) 12.2, (L2i_cache) 22.2, and a control logic 12.3, 22.3. The data caches (L1d) 14, (L2d) 24 of the different cache levels (L1) 10, (L2) 20 each comprise a directory (L1d_dir) 14.1, (L2d_dir) 24.1, a corresponding cache array (L1d_cache) 14.2, (L2d_cache) 24.2, and a control logic 14.3, 24.3. A first request arbiter 40 handles competition of requests directed to the same cache (L2i) 22 of the second cache level (L2) 20. A second request arbiter 60 handles competition of requests directed to the third cache level (L3) 30.

Figure 3:
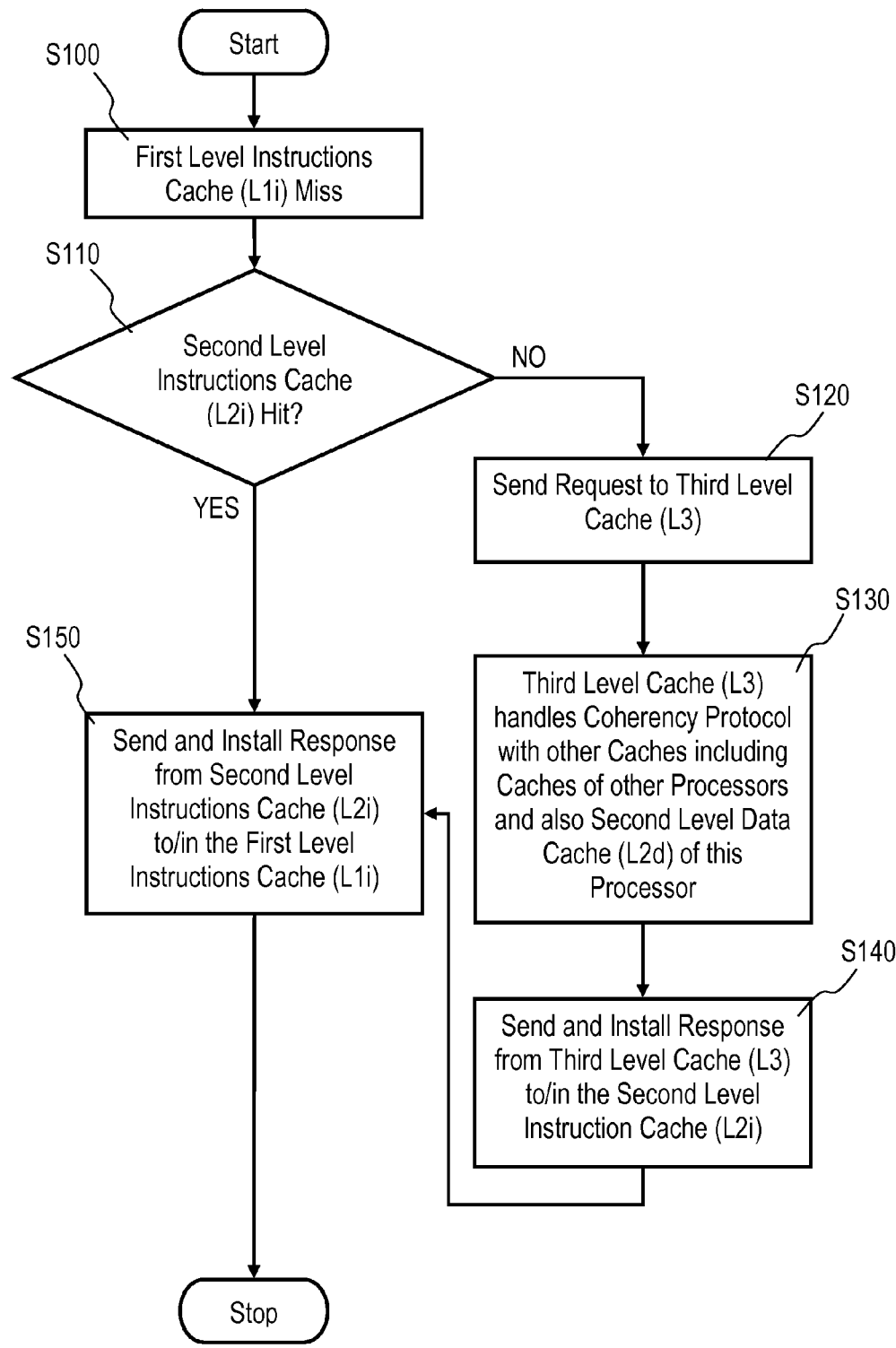
FIG. 3 is a schematic flow diagram of a method for cache handling in case of a first level instruction cache miss, in accordance with an embodiment of the present invention.
Figure 4:
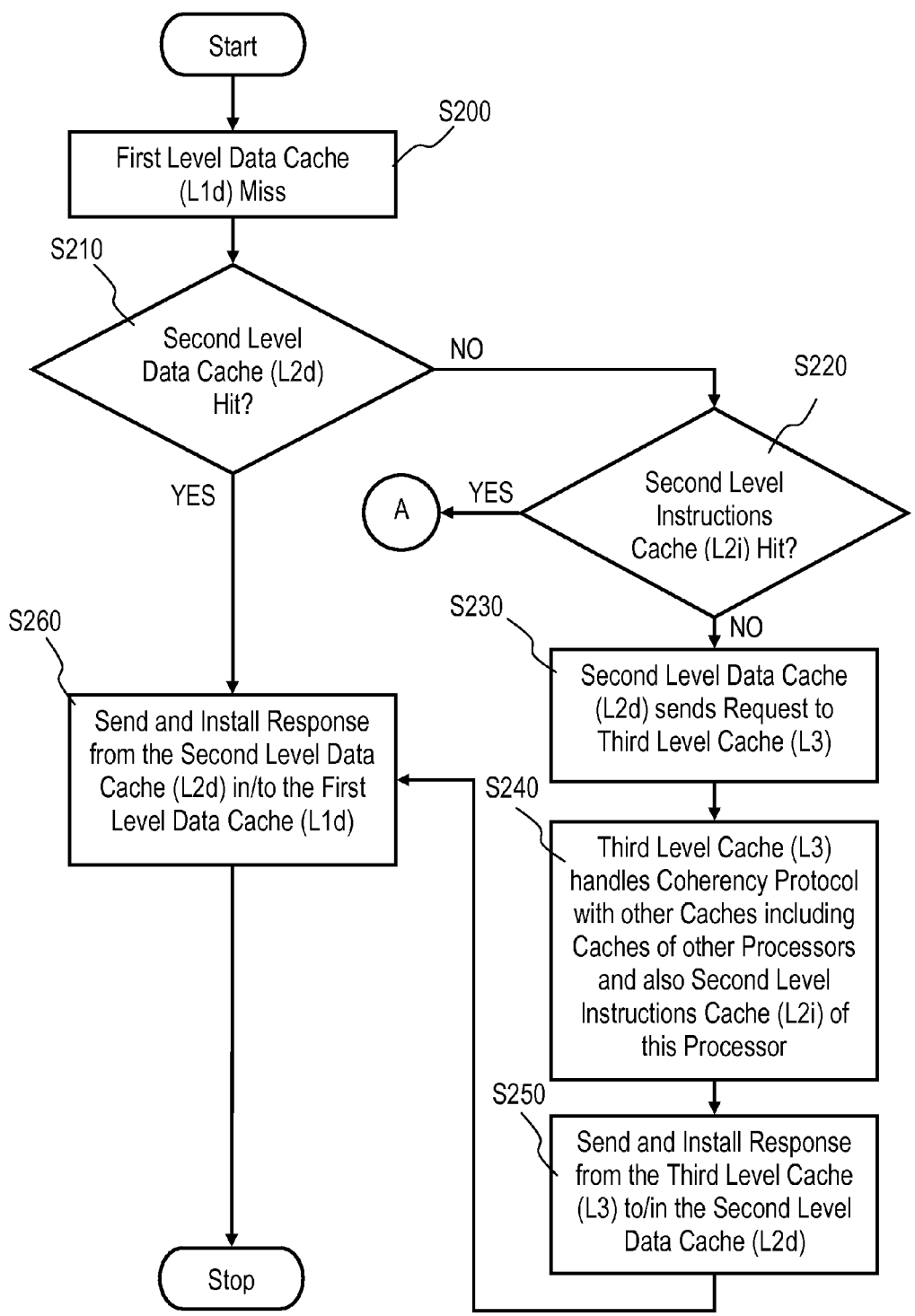
FIGS. 4 and 5 are schematic flow diagrams of a method for cache handling in case of a first level data cache miss, in accordance with an embodiment of the present invention.
Figure 5:
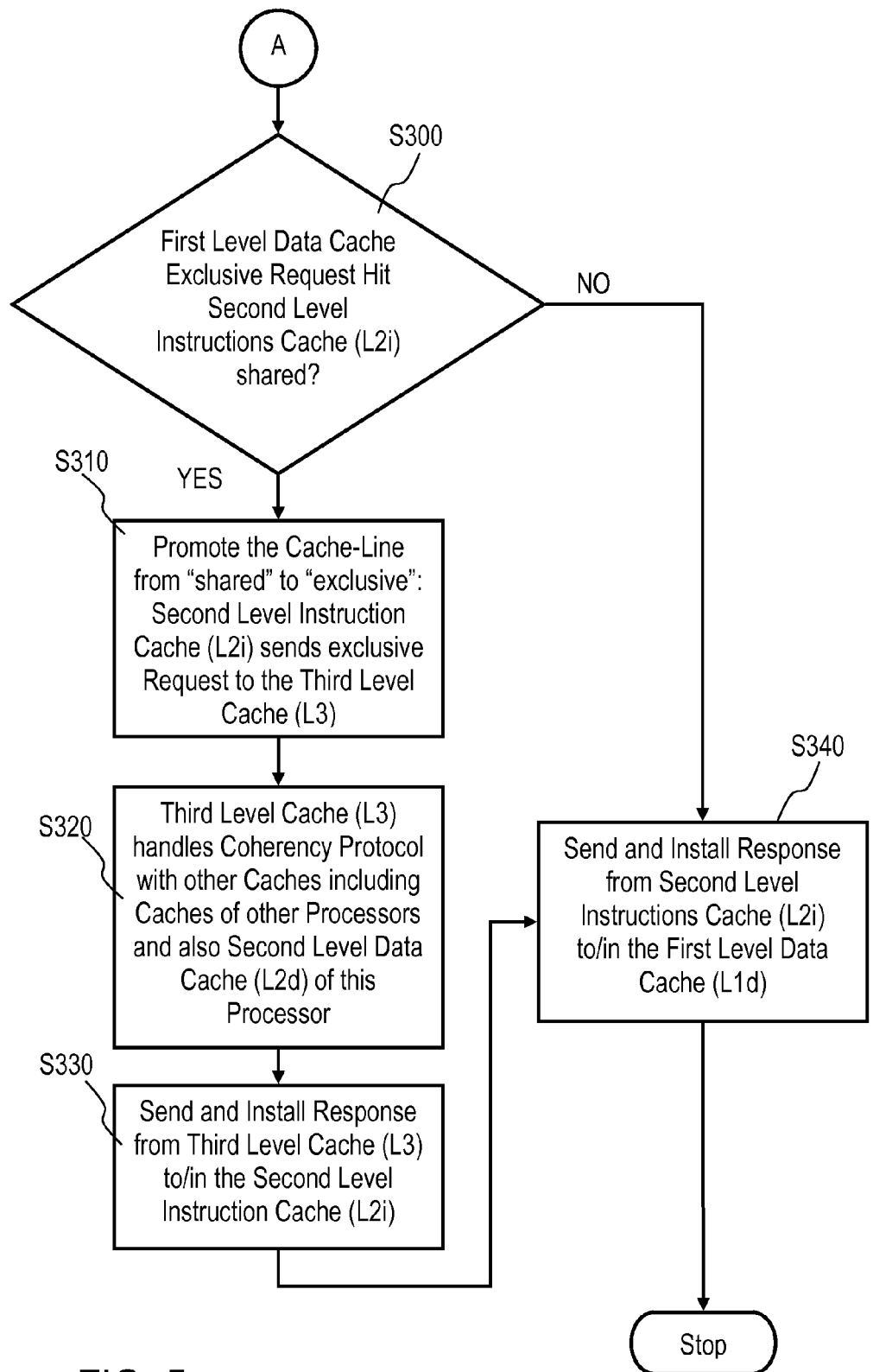

FIG. 3 shows steps of a method for cache handling in case of a first level instruction cache (L1i) miss, in accordance with an embodiment of the present invention; FIGS. 4 and 5 show steps of the method for cache handling in case of a first level data cache (L1d) miss, in accordance with an embodiment of the present invention.

Referring to FIGS. 1 to 5, according to a method for handling a hierarchical cache structure 1 comprising at least one higher level cache (L3) 30 with a unified cache array (L3_cache) 34 for data and instructions and at least two lower level cache (L1) 10, (L2) 20 each split in an instruction cache (L1i) 12, (L2i) 22 and a data cache (L1d) 14, (L2d) 24, an instruction cache (L2i) 22 and a data cache (L2d) 24 of a split second level cache (L2) 20 initiate requests to the third level cache (L3) 30. An instruction cache (L1i) 12 of a split first level cache (L1) 10 initiates requests to the instruction cache (L2i) 22 of the split second level cache (L2) 20 and a data cache (L1d) 14 of the split first level cache (L1) 10 initiates requests to the instruction cache (L2i) 22 and the data cache (L2d) 24 of the split second level cache (L2) 20.

Generally a search for a requested address is sent to a directory (L1i_dir) 12.1, (L1d_dir) 14.1, (L2i_dir) 22.1, (L2d_dir) 24.1, (L3_dir) 32 of corresponding cache level (L1) 10, (L2) 20, (L3) 30, 5. In case of a miss a directory (L1i_dir) 12.1, (L1d_dir) 14.1, (L2i_dir) 22.1, (L2d_dir) 24.1, (L3_dir) 32 of a corresponding cache level (L1) 10, (L2) 20, (L3) 30 sends the request to a directory (L2i_dir) 22.1, (L2d_dir) 24.1, (L3_dir) 32 of a next higher cache level (L2) 20, (L3) 30 until the request is sent to a main memory (5). In case of a hit a cache array (L2i_cache) 22.2, (L2d_cache) 24.2, (L3_cache) 34 of a corresponding cache level (L2) 20, (L3) 30, 5 sends a response to the request to a cache array (L1i_cache) 12.2, (L1d_cache) 14.2, (L2i_cache) 22.2, (L2d_cache) 24.2, (L3_cache) 34 of a next lower cache level (L1) 10, (L2) 20, (L3) 30 until the response is sent to a processor 3. The response installs cache-line data of the cache array (L2i_cache) 22.2, (L2d_cache) 24.2, (L3_cache) 34 of the higher cache level (L2) 20, (L3) 30, 5 in a corresponding cache array (L1i_cache) 12.2, (L1d_cache) 14.2, (L2i_cache) 22.2, (L2d_cache) 24.2, (L3_cache) 34 of the lower cache level (L1) 10, (L2) 20, (L3) 30 and updates a corresponding directory (L1i_dir) 12.1, (L1d_dir) 14.1, (L2i_dir) 22.1, (L2d_dir) 24.1, (L3_dir) 32 of the lower cache level (L1) 10, (L2) 20, (L3) 30 accordingly.

Referring to FIGS. 2 and 3, the processor 3 requests instructions from the first level instruction cache (L1i) 12. Therefore the processor 3 sends a corresponding search for the request address to the directory (L1i_dir) 12.1 of the first level instruction cache (L1i) 12. The directory (L1i_dir) 12.1 detects a miss in step S100 and sends the request to the directory (L2i_dir) 22.1 of the second level instruction cache (L2i) 22. The request consists of a command and a command validation and an address of the cache-line. The command is to distinguish between pre-fetch and demand fetch. In the shown embodiment the size of a cache-line is 256 bytes. The request has to compete with requests from the directory (L1d_dir) 14.1 of the first level data cache (L1d) 14. The first request arbiter 40 handles the competition of the requests to the second level instruction cache (L2i) 22. The request arbiter 40 makes sure none of the two requestors, i.e. directory (L1i_dir) 12.1 and directory (L1d_dir) 14.1 starves.

The directory (L2i_dir) 22.1 of the second level instruction cache (L2i) 22 performs a search. In case of a hit, step S110 goes to step S150. In case of a miss, step S110 goes to step S120. In step S120, the directory (L2i_dir) 22.1 of the second level instruction cache (L2i) 22 forwards the request to the directory (L3_dir) 32 of the third level cache (L3) 30 via the second request arbiter 60 of the third level cache (L3) 30. In step S130, the second request arbiter 60 of the third level cache (L3) 30 handles a coherency protocol and the competition of the request with other requests to the third level cache (L3) 30, for example, from other processors or from the second level data cache (L2d) 24 of this processor 3. If the directory (L3_dir) 32 of the third level cache (L3) 30 also has a cache miss, it requests the cache-line from the next level of the cache hierarchy before it sends a response. If it has a hit, it can respond immediately. In step S140, the third level cache (L3) 30 sends the response to the cache array (L2i_cache) 22.2 of the second level instruction cache (L2i) 22 with the cache-line data from the cache array (L3_cache) 34 of the third level cache (L3). The response installs the cache-line in the cache array (L2i_cache) 22.2 of the second level instruction cache (L2i) 22 and updates also the directory (L2i_dir) 22.1 of the second level instruction cache (L2i) 22 accordingly. In step S150, the second level instruction cache (L2i) 22 sends a response to the request to the first level instruction cache array (L1i) 12.2 with the cache-line data from the cache array (L2i_cache) 22.2 of the second level instruction cache (L2i) 22. The response installs the cache-line in the cache array (L1i_cache) 12.2 of the first level instruction cache (L1i) 12 and updates also the directory (L1i_dir) 12.1 of the first level instruction cache (L1i) 10 accordingly.

Referring to FIGS. 2, 4 and 5, the processor 3 requests data from the first level data cache (L1d) 14. Therefore the processor 3 sends a search for the request address to the directory (L1d_dir) 14.1 of the first level data cache (L1d) 14. The directory (L1d_dir) 14.1 detects a miss in step S200 and sends the request to the directory (L2d_dir) 24.1 of the second level data cache (L2d) 24 and also to the directory (L2i_dir) 22.1 of the second level instruction cache (L2i) 22 via the first request arbiter 40 of the second level instruction cache (L2i) 22. The request consists of a command and command validation and the address of the cache-line. The command is used to distinguish between pre-fetch and demand fetch, and also to distinguish between exclusive ownership and shared ownership. In one aspect of the present embodiment the size of the cache-line is 256 bytes. The cache protocol is used to prevent that the cache-line is valid in both, the second level data cache (L2d) 24 and in the second level instruction cache (L2i) 22 at the same time. If the cache-line is in the second level instruction cache (L2i) 22, both, the first level instruction cache (L1i) 12 and the first level data cache (L1d) 14 will fetch it from there. If the cache-line is in the second level data cache (L2d) 24 and it is requested by the first level instruction cache (L1i) 12, the cache-line is invalidated in the second level data cache (L2d) 24 and also in the first level data cache (L1d) 14 and installed in the second level instruction cache (L2i) 22. From there the first level data cache (L1d) 14 may re-fetch it, if necessary.

In case of a hit in the directory (L2d_dir) 24.1 of the second level data cache (L2d) 24, step S210 goes to step S260. In case of a miss in the directory (L2d_dir) 24.1 of the second level data cache (L2d) 24, this is signaled to a request generator 70 of the second level data cache (L2d) 24 and the step S210 goes to step S220. In case of a hit in the directory (L2i_dir) 22.1 of the second level instruction cache (L2i) 22 step S220 goes to step S300 of FIG. 5. In case of a miss in the directory (L2i_dir) 22.1, this is also signaled to the request generator 70 of the second level data cache (L2d) 24. The miss in the second level instruction cache (L2i) 22 or in the second level data cache (L2d) 24 is not forwarded directly to the second request arbiter 60 of the third level cache (L3) 30. If the request generator 70 of the second level data cache (L2d) 24 gets a miss for a request from both caches (L2i) 22 and (L2d) 24 of the second level cache (L2) 20, then it sends the request to the directory (L3_dir) 32 of the third level cache (L3) 30 via the second request arbiter 60 of the third level cache (L3) 30 in step S230. In step S240, the second request arbiter 60 of the third level cache (L3) 30 handles a coherency protocol and the competition of the request with other requests to the third level cache (L3) 30, for example, from other processors or from the second level instruction cache (L2i) 22 of this processor 3. If the directory (L3_dir) 32 of the third level cache (L3) 30 also has a cache-line miss, it requests the cache-line from the next level of the cache hierarchy 1 before it sends a response. If it has a hit, it can respond immediately. In step S250 the cache array (L3_cache) 34 of the third level cache (L3) 30 sends the response to the cache array (L2d_cache) 24.2 of the second level data cache (L2d) 24 with the cache-line data from the cache array (L3_cache) 34 of the third level cache (L3) 30. The response installs the cache-line in the cache array (L2d_cache) 24.2 of the second level data cache (S2d) 24.2 and updates also the directory (L2d_dir) 24.1 of the second level data cache (L2d) 24 accordingly. In step S260, the second level data cache (L2d) 24 forwards the response via the response arbiter 50 of the second level cache (L2) 20 to the first level data cache (L1d) 14. The response installs the cache-line of the cache array (L2d_cache) 24.2 of the second level data cache (L2d) 24 in the cache array (L1d_cache) 14.2 of the first level data cache (L1d) 14 and updates also the directory (L1d_dir) 14.1 of the first level data cache (L1d) 14. The response arbiter 50 of the second level cache (L2) 20 has two options for collision handling. The response arbiter 50 can invalidate one response and re-request it, or write one response into a buffer and transfer it to the first level data cache (L1d) 10 later.

In case of a hit in the instruction cache directory (L2i_dir) 22.1 of the second level cache (L2) 20, a corresponding response to the request is based on an ownership of the request and an ownership of a requested cache-line. In case of an exclusive ownership request hitting a shared ownership cache-line step S300 goes to step S310, else step S310 goes to step S340. In step S310, the second level instruction cache (L2i) 22 sends an exclusive request via the second request arbiter 60 to the third level cache (L3) 30 to promote the cache-line from the shared ownership to an exclusive ownership. In step S320, the second request arbiter 60 of the third level cache (L3) 30 handles a coherency protocol and the competition of the request with other requests to the third level cache (L3) 30, for example, from other processors or from the second level data cache (L2d) 24 of this processor 3. In step S330 the third level cache (L3) 30 sends the response to the second level instruction cache (L2i) 22. The response installs the exclusive cache-line from the cache array (L3_cache) 34 of the third level cache (L3) 30 in the cache array (L2i_cache) 22.2 of the second level instruction cache (L2i) 22, also updating the directory (L2i_dir) 22.1 of the second level instruction cache (L2i) 22. In step S340, the second level instruction cache (L2i) 22 forwards the response via the response arbiter 50 of the second level cache (L2) 20 to the first level data cache (L1d) 14. The response installs the exclusive cache-line of the cache array (L2i_cache) 22.2 of the second level instruction cache (L2i) 24 in the cache array (L1d_cache) 14.2 of the first level data cache (L1d) 14 and updates also the directory (L1d_dir) 14.1 of the first level data cache (L1d) 14.

The cache coherency protocol (MESI) allows requests with a shared ownership or with an exclusive ownership for the first level data cache (L1d) 14 misses. The first level instruction cache (L1i) 12 does not request exclusive rights, so all requests from the first level instruction cache (L1i) 12 have a shared ownership. When a cache-line is in the shared state, it allows copies to co-exist in more than one cache. These caches may be in different processors, and also in the first level instruction cache (L1i) 12 and in the first level data cache (L1d) 14. An exclusive copy of a cache-line does not allow a second copy in any other cache.

Table 1 lists all legal combinations of the states of a cache-line, in one embodiment. In Table 1 "S" represents a shared ownership, "X" represents an exclusive ownership, and "-" represent invalid.

TABLE 1

| State | L2i | L2d | L1i | L1d |
|---|---|---|---|---|
| 0 | — | — | — | — |
| 1 | S | — | — | — |
| 2 | X | — | — | — |
| 3 | — | S | — | — |
| 4 | — | x | — | — |
| 5 | — | X | — | X |
| 6 | — | X | — | S |
| 7 | — | S | — | S |
| 8 | S | — | S | — |
| 9 | S | — | S | S |
| 10 | S | — | — | S |
| 11 | X | — | S | — |
| 12 | X | — | S | S |
| 13 | X | — | — | S |
| 14 | X | — | — | X |

In Table 1, the following exemplary state transitions may occur:

Any state to state 0: Invalidate command from the third level cache (L3) or a second level cache (L2) replacement, i.e. second level instruction cache (L2i) and/or second level data cache (L2d).

Transitions 2 to 1, 11 to 8, 12 to 9, 13 to 10, 14 to 10: Third level cache (L3) request to demote an exclusive cache-line into a shared cache-line.

Transitions 5 to 7, 6 to 7, 4 to 3: Third level cache (L3) request to demote an exclusive line into a shared cache-line.

Transition 0 to 8: A miss in the first level instruction cache (L1i) is responded with a request for a shared cache-line.

Transition 0 to 7: A miss in the first level data cache (L1d) is responded with a request for a shared cache line.

Transition 0 to 5: A miss in the first level data cache (L1d) is responded with a request for exclusive.

Transition 1 to 8: A miss in the first level instruction cache (L1i) is responded with a request for a shared cache-line.

Transition 1 to 10: A miss in the first level data cache (L1d) is responded with a request for a shared cache-line.

Transition 1 to 14: A miss in the first level data cache (L1d) is responded with a request for an exclusive cache-line.

Transition 2 to 11: A miss in the first level instruction cache (L1i) is responded with a request for a shared cache-line.

Transition 2 to 13: A miss in the first level data cache (L1d) is responded with a request for a shared cache-line.

Transition 2 to 14: A miss in the first level data cache (L1d) is responded with a request for an exclusive cache-line.

Transition 5 to 4: First level data cache (L1d) replacement.

Transition 5 to 8: A miss in the first level instruction cache (L1i) is responded with a request for a shared cache-line.

Transition 6 to 5: First level data cache (L1d) request for an exclusive cache-line (hits shared in the first level data cache (L1d)).

Transition 6 to 4: First level data cache (L1d) replacement.

Transition 6 to 8: A miss in the first level instruction cache (L1i) is responded with a request for a shared cache-line.

Transition 7 to 3: First level data cache (L1d) replacement.

Transition 7 to 5: First level data cache (L1d) request for an exclusive cache-line (hits shared in the first level data cache L1d and the second level data cache (L2d)).

Transition 7 to 8: A miss in the first level instruction cache (L1i) is responded with a request for a shared cache-line.

Transition 8 to 1: First level instruction cache (L1i) replacement.

Transition 8 to 9: A miss in the first level data cache (L1d) is responded with a request for a shared cache-line.

Transition 8 to 14: A miss in the first data cache (L1d) is responded with a request for an exclusive cache-line.

Transition 9 to 10: First level instruction cache (L1i) replacement.

Transition 9 to 8: First level data cache (L1d) replacement.

Transition 9 to 14: A miss in the first level data cache (L1d) is responded with a request for an exclusive cache-line.

Transition 10 to 1: First level data cache (L1d) replacement.

Transition 10 to 9: A miss in the first instruction cache (L1i) is responded with a request for a shared cache-line.

Transition 10 to 14: A miss in the first data cache (L1d) is responded with a request for an exclusive cache-line.

Transition 11 to 2: First level instruction cache (L1i) replacement.

Transition 11 to 12: A miss in the first level data cache (L1d) is responded with a request for a shared cache-line.

Transition 11 to 14: A miss in the first level data cache (L1d) is responded with a request for an exclusive cache-line.

Transition 12 to 11: First level data cache (L1d) replacement.

Transition 12 to 13: First level instruction cache (L1i) replacement.

Transition 12 to 14: A miss in the first level data cache (L1d) is responded with a request for an exclusive cache-line.

Transition 13 to 12: A miss in the first level instruction cache (L1i) is responded with a request for a shared cache-line.

Transition 13 to 2: First level data cache (L1d) replacement.

Transition 13 to 14: A hit for a shared cache-line in the first level data cache (L1d) is responded with a request for an exclusive cache-line.

Transition 14 to 2: First level data cache (L1d) replacement.

Transition 14 to 12: A miss in the first level instruction cache (L1i) is responded with a request for a shared cache-line.

Transition 3 to 5: A miss in the first level data cache (L1d) is responded with a request for an exclusive cache-line.

Transition 3 to 7: A miss in the first data cache (L1d) is responded with a request for a shared cache-line.

Transition 3 to 8: A miss in the first level instruction cache (L1i) is responded with a request for a shared cache-line.

Transition 4 to 5: A miss in the first level data cache (L1d) is responded with a request for an exclusive cache-line.

Transition 4 to 6: A miss in the first level data cache (L1d) is responded with a request for a shared cache-line.

Transition 4 to 8: A miss in the first level instruction cache (L1i) is responded with a request for a shared cache-line.

As the first level caches (L1) are smaller than the second level caches (L2), the first level data cache (L1d) and the first level instruction cache (L1i) may lose a cache-line because of cache replacement. Any cache-line valid in the second level instruction cache (L2i) was initially requested by the first level instruction cache (L1i) (state 8). If the first level data cache (L1d) requests a shared cache-line and hits in the second level instruction cache (L2i), it results in state 9, or in state 10, if the first level instruction cache (L1i) has already lost the cache-line. If the first level data cache (L1d) requests an exclusive cache-line and hits in the second level instruction cache (L2i), state 14 is reached. If now the first level instruction cache (L1i) requests the cache-line (always shared), the result is state 11 or 12.

The above described state transitions have been presented for purposes of illustration only, but are not intended to be exhaustive or limiting aspects of the present invention to the state transitions disclosed.

In an embodiment of the present invention, a hierarchical cache structure is provided that comprises at least one higher level cache comprising a unified cache array for data and instructions and at least two lower level caches each split in an instruction cache and a data cache; wherein an instruction cache and a data cache of a split second level cache are connected to a third level cache; and wherein an instruction cache of a split first level cache is connected to the instruction cache of the split second level cache and a data cache of the split first level cache is connected to the instruction cache and the data cache of the split second level cache.

In further embodiments of the present invention, the third level cache comprises a directory for the unified cache array.

In further embodiments of the present invention, the instruction caches each comprise a directory and a corresponding cache array, wherein the data caches each comprise a directory and a corresponding cache array.

In further embodiments of the present invention, cache-line data shared by two cache arrays of the first cache level are valid in a cache array of the second level instruction cache and not in a cache array of the second level data cache.

In further embodiments of the present invention, at least one request arbiter handles competition of requests directed to the same cache.

In another embodiment of the present invention, in a method for handling a hierarchical cache structure comprising at least one higher level cache with a unified cache array for data and instructions and at least two lower level caches each split in an instruction cache and a data cache, an instruction cache and a data cache of a split second level cache initiate requests to a third level cache; wherein an instruction cache of a split first level cache initiates requests to the instruction cache of the split second level cache and a data cache of the split first level cache initiates requests to the instruction cache and the data cache of the split second level cache.

In further embodiments of the present invention, a request comprises a command, a command valid and an address of a corresponding cache-line.

In further embodiments of the present invention, a search for a requested address is sent to a directory of a corresponding cache level, wherein in case of a miss a directory of a corresponding cache level sends the request to a directory of a next higher cache level until the request is sent to a main memory, and wherein in case of a hit a cache array of a corresponding cache level sends a response to the request to a cache array of a next lower cache level until the response is sent to a processor.

In further embodiments of the present invention, the response installs cache-line data of the cache array of the higher cache level in a corresponding cache array of the lower cache level and updates a corresponding directory of the lower cache level accordingly.

In further embodiments of the present invention, a search for a requested instruction address is sent from the central processing unit to an instruction cache directory of the first level cache, wherein in case of a miss the instruction cache directory of the first level cache sends the request to an instruction cache directory of the second level cache, wherein in case of a hit a response to the request is sent to a cache array of the first level instruction cache with cache-line data from a cache array of the second level instruction cache, and wherein in case of a miss the instruction cache directory of the second level cache sends the request to a directory of a third level cache.

In further embodiments of the present invention, a search for a requested data address is sent from the central processing unit to a data cache directory of the first level cache, wherein in case of a miss the data cache directory of the first level cache sends the request to a data cache directory of the second level cache, and to the instruction cache directory of the second level cache.

In further embodiments of the present invention, in case of a hit in the instruction cache directory of the second level cache a corresponding response to the request is based on an ownership of the request and an ownership of a requested cache-line; wherein in case of an exclusive ownership request hitting a shared ownership cache-line an ownership promotion of the cache-line to exclusive is initiated by the second level instruction cache, else a response to the request is sent from the cache array of the second level instruction cache to the cache array of the first level data cache with cache-line data from the cache array of the second level instruction cache accordingly updating the data cache directory of the first cache level, wherein in case of a miss in the instruction cache directory of the second level cache a report signal is sent to a request generator, wherein in case of a hit in the data cache directory of the second level cache the response to the request is sent from the cache array of the second level data cache to the cache array of the first level data cache with cache-line data from the cache array of the second level data cache accordingly updating the data cache directory of the first cache level, and wherein in case of a miss in the data cache directory of the second level cache a report signal is sent to the request generator, wherein the request generator sends the request to a directory of a third level cache only if the instruction cache directory and the data cache directory of the second level cache both report a miss to the request generator, wherein the third level cache sends a response to the request of the request generator to the second level data cache, wherein the response comprises the requested cache-line from a higher level cache, wherein the requested cache-line is installed in the cache array of the second level data cache and in the cache array of the first level data cache, and wherein corresponding directories of the second level data cache and the first level data cache are updated accordingly.

In further embodiments of the present invention, the instruction cache directory of the second level cache sends an exclusive ownership request to the directory of the third level cache, wherein a corresponding response to the request comprises the requested exclusive cache-line from a higher level cache, wherein the requested exclusive cache-line is installed in the cache array of the second level instruction cache and in the cache array of the first level data cache, and wherein corresponding directories of the second level instruction cache and the first level data cache are updated accordingly.

In another embodiment of the present invention, a data processing program for execution in a data processing system comprises software code portions for performing a method for handling a hierarchical cache structure when the program is run on the data processing system.

In yet another embodiment of the present invention, a computer program product stored on a computer-usable medium, comprises computer-readable program means for causing a computer to perform a method for handling a hierarchical cache structure when the program is run on the computer.

Embodiments of the present invention improve coherence between instruction cache and data cache in a multi-level cache hierarchy.

Embodiments of the present invention link the data cache and the instruction cache within different levels of the cache hierarchy. This "hybrid" cache is optimal for the performance of code with cache-lines that contain instructions and data, e.g. variables updated by the execution of the code placed in the same cache-line as the instructions.

In embodiments of the present invention, a miss in a first level data cache that results in a miss of a second level cache, i.e. a miss in the second level instruction cache and a miss in the second level data cache is installed in the second level data cache. A miss in a first level instruction cache that results in a miss in the second level instruction cache is installed in the second level instruction cache, but a miss in the first level data cache that hits in the second level instruction cache gets the cache-line from the second instruction cache. This includes the case of an exclusive fetch for a store.

The above, as well as additional purposes, features, and advantages of the present invention are apparent in the detailed written description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for handling a hierarchical cache structure, the computer program product comprising:
a non-transitory computer readable storage medium readable by a processing circuit and storing instructions for execution by the processing circuit for performing a method comprising:
initiating requests to a third level cache of the hierarchical cache structure by an instruction cache and a data cache of a split second level cache of the hierarchical cache structure, the hierarchical cache structure comprising at least one higher level cache with a unified cache array for data and instructions and at least two lower level caches, each split in an instruction cache and a data cache; and
initiating requests by an instruction cache of a split first level cache to said instruction cache of said split second level cache, and initiating requests by a data cache of said split first level cache to said instruction cache and said data cache of said split second level cache.

2. The computer program product according to claim 1, wherein a request comprises a command, a command validation and an address of a corresponding cache-line.

3. The computer program product according to claim 1, wherein the method further comprises sending a search for a requested address to a directory of a corresponding cache level, wherein in case of a miss, sending by a directory of a corresponding cache level said request to a directory of a next higher cache level until said request is sent to a main memory, and wherein in case of a hit, sending by a cache array of a corresponding cache level a response to said request to a cache array of a next lower cache level until said response is sent to a processor.

4. The computer program product according to claim 3, wherein said response installs cache-line data of said cache array of said higher cache level in a corresponding cache array of said lower cache level and updates a corresponding directory of said lower cache level accordingly.

5. The computer program product according to claim 3, wherein the method further comprises sending a search for a requested instruction address from said processor to an instruction cache directory of said first level cache, wherein in case of a miss, sending by said instruction cache directory of said first level cache said request to an instruction cache directory of said second level cache, wherein in case of a hit, sending a response to said request to a cache array of said first level instruction cache with cache-line data from a cache array of said second level instruction cache, and wherein in case of a miss, sending by said instruction cache directory of said second level cache said request to a directory of a third level cache.

6. The computer program product according to claim 3, wherein a search for a requested data address is sent from said central processing unit to a data cache directory of said first level cache, wherein in case of a miss said data cache directory of said first level cache sends said request to a data cache directory of said second level cache, and to said instruction cache directory of said second level cache.

7. The computer program product according to claim 6, wherein in case of a hit in said instruction cache directory of said second level cache, a corresponding response to said request is based on an ownership of said request and an ownership of a requested cache-line; wherein in case of an exclusive ownership request hitting a shared ownership cache-line, an ownership promotion of said cache-line to exclusive is initiated by said second level instruction cache, else a response to said request is sent from said cache array of said second level instruction cache to said cache array of said first level data cache with cache-line data from said cache array of said second level instruction cache accordingly updating said data cache directory of said first cache level, wherein in case of a miss in said instruction cache directory of said second level cache, a report signal is sent to a request generator, wherein in case of a hit in said data cache directory of said second level cache, said response to said request is sent from said cache array of said second level data cache to said cache array of said first level data cache with cache-line data from said cache array of said second level data cache accordingly updating said data cache directory of said first cache level, and wherein in case of a miss in said data cache directory of said second level cache, a report signal is sent to said request generator, wherein said request generator sends said request to a directory of a third level cache only if said instruction cache directory and said data cache directory of said second level cache both report a miss to said request generator, wherein said third level cache sends a response to said request of said request generator to said second level data cache, wherein said response comprises said requested cache-line from a higher level cache, wherein said requested cache-line is installed in said cache array of said second level data cache and in said cache array of said first level data cache, and wherein corresponding directories of said second level data cache and said first level data cache are updated accordingly.

8. The computer program product according to claim 7, wherein said instruction cache directory of said second level cache sends an exclusive ownership request to said directory of said third level cache, wherein a corresponding response to said request comprises said requested exclusive cache-line from a higher level cache, wherein said requested exclusive cache-line is installed in said cache array of said second level instruction cache and in said cache array of said first level data cache, and wherein corresponding directories of said second level instruction cache and said first level data cache are updated accordingly.

9. A method of handling a hierarchical cache structure, the method comprising:
initiating requests to a third level cache of the hierarchical cache structure by an instruction cache and a data cache of a split second level cache of the hierarchical cache structure, the hierarchical cache structure comprising at least one higher level cache with a unified cache array for data and instructions and at least two lower level caches, each split in an instruction cache and a data cache; and
initiating requests by an instruction cache of a split first level cache to said instruction cache of said split second level cache, and initiating requests by a data cache of said split first level cache to said instruction cache and said data cache of said split second level cache.

10. The method according to claim 9, wherein a request comprises a command, a command validation and an address of a corresponding cache-line.

11. The method according to claim 9, further comprising sending a search for a requested address to a directory of a corresponding cache level, wherein in case of a miss, sending by a directory of a corresponding cache level said request to a directory of a next higher cache level until said request is sent to a main memory, and wherein in case of a hit, sending by a cache array of a corresponding cache level a response to said request to a cache array of a next lower cache level until said response is sent to a processor.

12. The method according to claim 11, wherein said response installs cache-line data of said cache array of said higher cache level in a corresponding cache array of said lower cache level and updates a corresponding directory of said lower cache level accordingly.

13. The method according to claim 11, further comprising sending a search for a requested instruction address from said processor to an instruction cache directory of said first level cache, wherein in case of a miss, sending by said instruction cache directory of said first level cache said request to an instruction cache directory of said second level cache, wherein in case of a hit, sending a response to said request to a cache array of said first level instruction cache with cache-line data from a cache array of said second level instruction cache, and wherein in case of a miss, sending by said instruction cache directory of said second level cache said request to a directory of a third level cache.

14. The method according to claim 11, wherein a search for a requested data address is sent from said central processing unit to a data cache directory of said first level cache, wherein in case of a miss said data cache directory of said first level cache sends said request to a data cache directory of said second level cache, and to said instruction cache directory of said second level cache.

15. The method according to claim 14, wherein in case of a hit in said instruction cache directory of said second level cache, a corresponding response to said request is based on an ownership of said request and an ownership of a requested cache-line; wherein in case of an exclusive ownership request hitting a shared ownership cache-line, an ownership promotion of said cache-line to exclusive is initiated by said second level instruction cache, else a response to said request is sent from said cache array of said second level instruction cache to said cache array of said first level data cache with cache-line data from said cache array of said second level instruction cache accordingly updating said data cache directory of said first cache level, wherein in case of a miss in said instruction cache directory of said second level cache, a report signal is sent to a request generator, wherein in case of a hit in said data cache directory of said second level cache, said response to said request is sent from said cache array of said second level data cache to said cache array of said first level data cache with cache-line data from said cache array of said second level data cache accordingly updating said data cache directory of said first cache level, and wherein in case of a miss in said data cache directory of said second level cache, a report signal is sent to said request generator, wherein said request generator sends said request to a directory of a third level cache only if said instruction cache directory and said data cache directory of said second level cache both report a miss to said request generator, wherein said third level cache sends a response to said request of said request generator to said second level data cache, wherein said response comprises said requested cache-line from a higher level cache, wherein said requested cache-line is installed in said cache array of said second level data cache and in said cache array of said first level data cache, and wherein corresponding directories of said second level data cache and said first level data cache are updated accordingly.

16. The method according to claim 15, wherein said instruction cache directory of said second level cache sends an exclusive ownership request to said directory of said third level cache, wherein a corresponding response to said request comprises said requested exclusive cache-line from a higher level cache, wherein said requested exclusive cache-line is installed in said cache array of said second level instruction cache and in said cache array of said first level data cache, and wherein corresponding directories of said second level instruction cache and said first level data cache are updated accordingly.

17. A hierarchical cache structure comprising:
   at least one higher level cache comprising a unified cache array for data and instructions and at least two lower level caches, each split in an instruction cache and a data cache;
   wherein an instruction cache and a data cache of a split second level cache are connected to a third level cache; and
   wherein an instruction cache of a split first level cache is connected to said instruction cache of said split second level cache and a data cache of said split first level cache is connected to said instruction cache and said data cache of said split second level cache.

18. The hierarchical cache structure according to claim 17, wherein said third level cache comprises a directory for said unified cache array.

19. The hierarchical cache structure according to claim 17, wherein said instruction caches each comprise a directory and a corresponding cache array, and wherein said data caches each comprise a directory and a corresponding cache array.

20. The hierarchical cache structure according to claim 19, wherein cache-line data shared by two cache arrays of said first cache level are valid in a cache array of said second level instruction cache and not in a cache array of said second level data cache.

* * * * *